United States Patent [19]

Schaefer

[11] 4,006,292
[45] Feb. 1, 1977

[54] INFORMATION RECORDING AND REPRODUCING SYSTEM WITH PLURAL INFORMATION TRACKS WITHIN A SINGLE GROOVE

[75] Inventor: Louis F. Schaefer, Palo Alto, Calif.

[73] Assignee: Sharp Corporation, Osaka, Japan

[22] Filed: Sept. 3, 1974

[21] Appl. No.: 502,559

[52] U.S. Cl. .................. 358/128; 179/100.3 V; 179/100.3 B
[51] Int. Cl.² .................. H04N 5/76; G11B 11/00
[58] Field of Search ....... 178/6.6 A, 6.6 R, 6.6 DD, 178/6.7 A, DIG. 3; 179/100.3 V, 100.3 B; 360/20, 22, 23

[56] References Cited
UNITED STATES PATENTS

| | | | |
|---|---|---|---|
| 3,235,672 | 2/1966 | Beguin | 179/100.3 V |
| 3,278,678 | 10/1966 | Rank | 360/21 |
| 3,730,983 | 5/1973 | Nomakura | 360/20 |
| 3,732,364 | 5/1973 | Terada | 360/20 |
| 3,854,015 | 12/1974 | Janssen | 360/77 |

OTHER PUBLICATIONS

"An Experimental Optical Videodisc Playback System" by Hrbek, July 1974, Journal of the SMPIE, vol. 83, p. 581.
"The Optical Scanning System of the Philips 'VLP' Record Player" by Bouwhuis and Burgstede; Philips Tech. Rev. 33, pp. 186–189, 1973, No. 7.
"The Philips 'VLP' System", by Compaan and Kramer, Philips Tech. Rev. 33, No. 7, Oct. 1973, pp. 178–180.

Primary Examiner—Daryl W. Cook
Assistant Examiner—Alan Faber
Attorney, Agent, or Firm—Flehr, Hohbach, Test, Albritton & Herbert

[57] ABSTRACT

An information transfer system having a high information transfer rate of the type utilizing a storage medium and associated transducer means, the combination including a movable storage medium having an information path formed thereon and having an information storage capacity. Transducer means is adapted to sequentially scan the information stored along said information path and respond to information stored along said path. The combination further includes a first information reproduction channel including a first information track formed along said path on said medium and a first transducer responsive to said first track, said first channel having a rate limited information transfer capacity of C1 and a second information reproduction channel including a second information track formed along said path on said medium and a second transducer responsive to said second track, said second channel having a rate limited information transfer capacity of C2. Means is provided for combining the output of said first and second channels to provide an information transfer capacity of the sum of C1 and C2.

2 Claims, 3 Drawing Figures

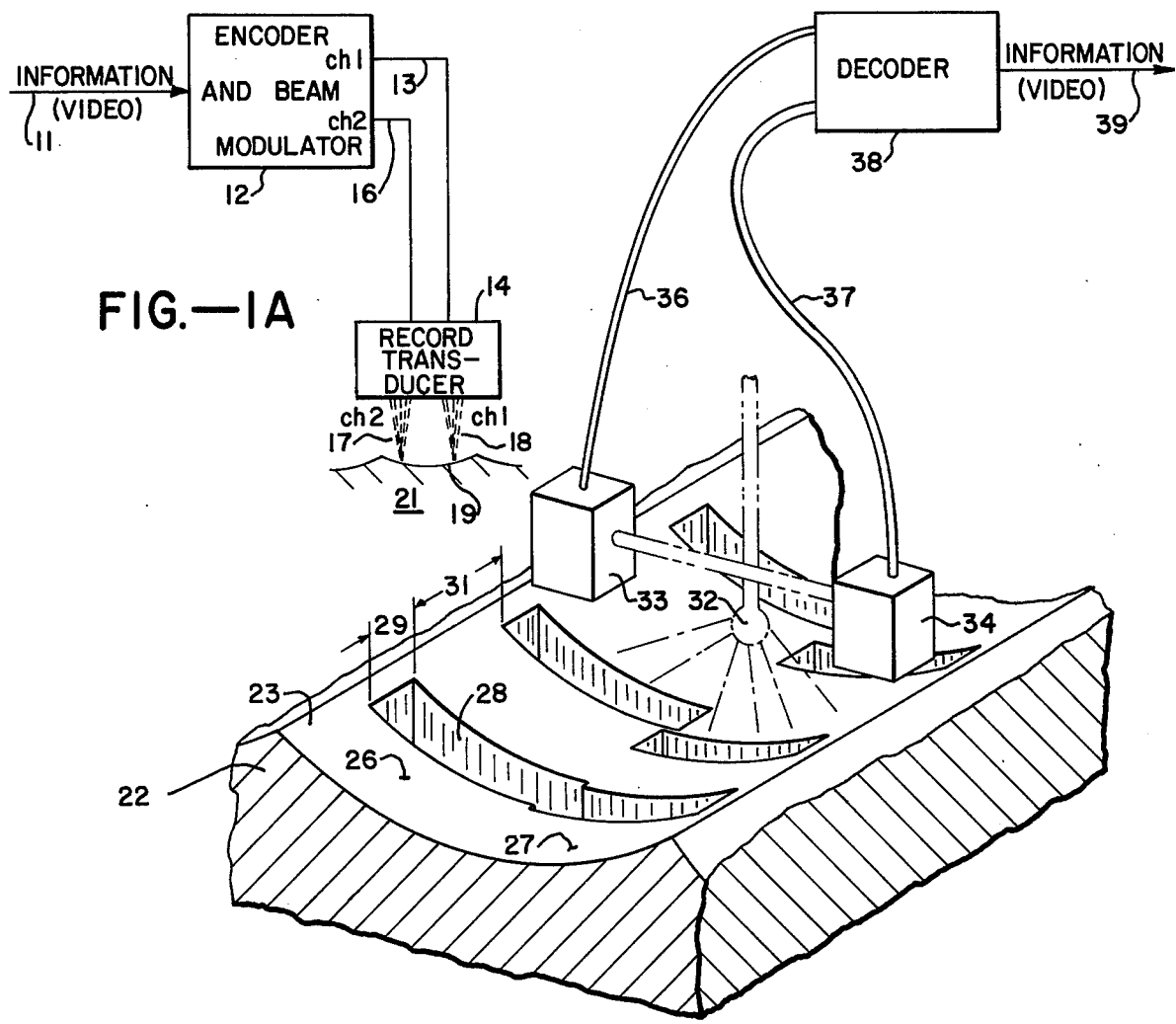
FIG.—1A
FIG.—1B
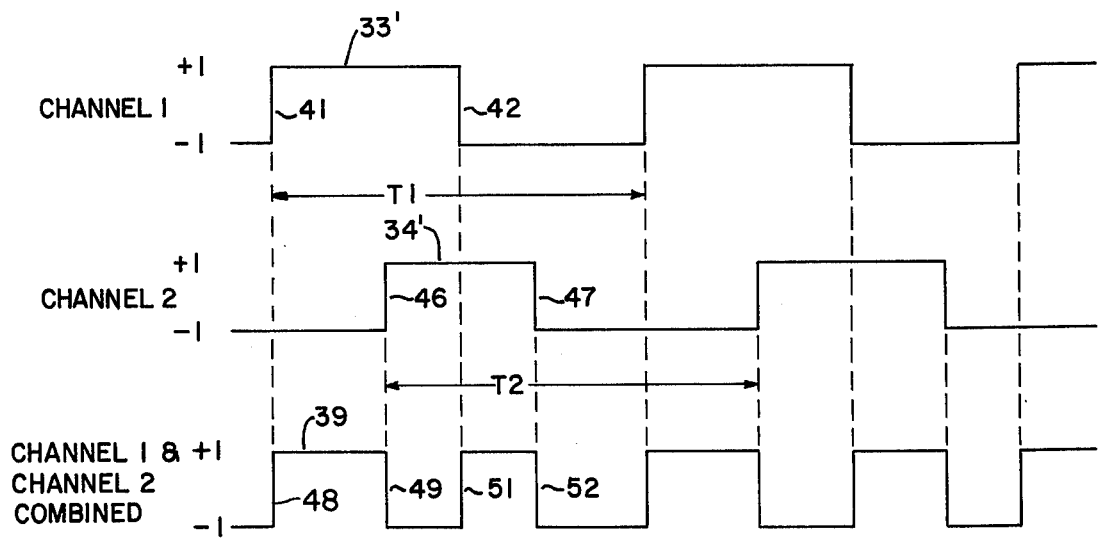
FIG.—2

INFORMATION RECORDING AND REPRODUCING SYSTEM WITH PLURAL INFORMATION TRACKS WITHIN A SINGLE GROOVE

CROSS-REFERENCE TO RELATED APPLICATION

SINGLE LENS MULTI-BEAM SYSTEM FOR HIGH RESOLUTION RECORDING OF INFORMATION AND ARTICLE, Ser. No. 502,558, filed Sept. 3, 1974, invented by Donald R. Cone, assigned to common assignees.

CONTACTING PICKUP OPTICAL REPRODUCTION SYSTEM, Ser. No. 502,810, filed Sept. 3, 1974, invented by Louis F. Schaefer, Philip J. Rice and Hugh F. Frohback, assigned to common assignees.

*Flehr, Hohback, Test No. A29061 **Flehr, Hohbach, Test No. A29059

BACKGROUND OF THE INVENTION

This invention relates generally to the multiplexing of wideband information for recording of the information on a recording medium and the subsequent reproduction and demultiplexing of the recorded information. More particularly, this invention relates to the multiplexing of wideband information such as video and digital information signals, for improved information packing density recording on a disc, and the subsequent reproduction of the information carried by the disc.

Information processing systems for recording, storage, and subsequent reproduction of wideband information carried by a grooved recording medium, such as video bandwidth information stored on a video disc, are known in the art. Present systems however, often employ grooves for mechanical tracking purposes and record information in a track within the groove. The information packing density is such systems is often limited by the groove-to-groove spacing which is determined by mechanical constraints and not by the fundamental properties of the system. This is the result of placing only one information track in a groove.

Thus there is a need for a high information transfer rate system and method which provides improved information packing density and concomitant high information transfer rates in a disc system.

SUMMARY OF THE INVENTION AND OBJECTS

Accordingly, it is a general object of the present invention to provide an improved high density and high transfer rate information transfer system and a method for improved utilization of the information storage capacity of a grooved recording medium.

It is a particular object of the present invention to provide a system and method for multiplexed recording of composite video and sound signals on a video disc and subsequent reproduction and demultiplexing of the stored video information.

The foregoing and other objects of the invention are achieved in an information transfer system having a high information transfer rate of the type utilizing a storage medium and associated transducer means. The system includes a movable storage medium having an information path formed thereon and having an information storage capacity. Transducer means is adapted to sequentially scan the information stored along said information path and respond to information stored along said path. The combination further includes a first information reproduction channel including a first information track formed along said path on said medium and a first transducer responsive to said first track, said first channel having a rate limited information transfer capacity of C1. Further included is a second information reproduction channel which comprises a second information track formed along said path on said medium and a second transducer responsive to said second track, said second channel having a rate limited information transfer capacity of C2. The system further includes means for combining the output of said first and second channels to provide an information transfer capacity of the sum of C1 and C2.

BRIEF DESCRIPTION OF THE DRAWINGS

FIG. 1A is a symbolic block diagram of the information encoder, and record transducer in conjunction with an enlarged cross-sectional view of a grooved recording medium.

FIG. 1B is an enlarged isometric, cross-sectional view of a portion of a single groove of a recording medium carrying recorded information in conjunction with a transducer and decoder symbolic block diagram for reproduction of the recorded information.

FIG. 2 is a graphical representation of the maximum information transfer rates of the individually encoded channels of the processing system showing a graphical summation of the information transfer rates to achieve an improved information transfer capacity.

DESCRIPTION OF THE PREFERRED EMBODIMENT

An information transfer system for multiplexed high density recording and subsequent demultiplexing and reproduction of wideband information such as wideband digital or video information is shown in the accompanying Figures. Briefly, in general overview, video information is multiplexed and recorded along an information path. The path may, in a specific embodiment, be positioned along a single groove formed in a recording medium. The recording method may be as disclosed in cross-referenced SINGLE LENS MULTI-BEAM SYSTEM AND METHOD FOR HIGH RESOLUTION RECORDING OF INFORMATION ON A MOVING RECORDING MEDIUM AND ARTICLE. In this cross-referenced disclosure an electron beams writes directly on an electron-sensitive resist to provide high resolution, high packing density information storage. As will be seen, information may be recorded, as surface-storage elements or pits having variable dimensions and spacing along recording surfaces along the information paths. The surfaces may be formed in the walls of a grooved disc as a function of the input signal. The exposed disc is used to form a recorded master disc which may then be utilized for multiple pressing of replica discs. Subsequently, transducer means scans the recording surfaces and is responsive to light reflected by the pits, and the encoded variable pit dimensions and spacing are decoded to provide the baseband information originally recorded.

Referring to Figure 1A, the video encoding and recording is symbolically shown. Information signal 11 for example a video signal, comprising composite audio, chroma and luminance video information at baseband is connected to the input of encoder and demodulator 12. Encoder 12 has a first output 13, corresponding to a first information channel which is connected to the channel 1 input of record transducer 14. A second output 16 of encoder 12, corresponding to a second information channel is connected to the channel 2 input of record transducer 14. Transducer 14 provides means for recording the channel 1 and channel 2 encoded information in the confronting walls of groove 19 formed in recording medium 21. Encoder 12 may, for example, divide the incoming signal 11 into equal capacity channels and transducer 14 may provide an electron beam for each channel which is modulated by the encoded information which alternatively blanks or exposes electron-sensitive resist formed in the walls of the groove 19. See cross-referenced application SINGLE LENS, MULTI-BEAM SYSTEM AND METHOD. As discussed in that disclosure, the exposed resist is then used to pattern the underlying master disc 21 which is then subsequently used for multiple pressing of replica discs.

Referring to FIG. 1B, a portion of a replica disc 22 is shown having a groove 23 formed therein. Recording surfaces 26 and 27 are formed in the confronting side walls of groove 23. Plural, optically reflective, surface-storage elements or pits 28 are formed in recording surfaces 26 and 27 to form respective first and second information tracks. The pits 28 in the respective surfaces may abut or overlap adjacent surface so long as their edges may be individually resolved, as will be later seen. Pits 28 may have a variable width 29 and a variable spacing 31 along the respective recording surfaces 26 and 27. The variable width and spacing of the pits along the surfaces is a function of and corresponds to the information encoded by encoder 12. Illumination means 32 is provided and may be in any position which permits modulated light to be received at the transducers. For example light may be alternately reflected or blanked by the variable width and variable spaced pits 28 along the respective recording surfaces 26 and 27. Transducer means includes spaced transducers 33 and 34 which scan the recording surfaces to alternately receive the reflected light or blocked light present at the surfaces as the transducers 33 and 34 scan the respective information tracks.

As disclosed in cross-referenced CONTACTING STYLUS OPTICAL REPRODUCTION SYSTEM, transducers 33 and 34 may be spaced optical waveguides positioned in a contacting stylus which slidably moves along the groove. It is understood, however, that the present multiplex recording technique is not specifically limited to a particular contacting or non-contacting transducer. Further, the system may employ and the transducer may be responsive to other than optical stimulus provided that such stimulus is provided along two information tracks positioned along an information path formed on a recorded medium and thus is in accord with the spirit of the present invention. Coupling means 36 connects transducer 33 to the first input of decoder 38 and means 37 connects the output of transducer 34 to a second input of decoder 38. Decoder 38, as will be presently seen, combines the outputs of the respective transducers which were previously multiplexed in the recording process, to thereby reproduce the video information previously recorded. Decoder 38 has an output video signal 39 which is connected to a conventional reproduction equipment.

In operation, the spaced transducers 33 and 34 are caused to move along, scan and be responsive to the reflected or alternatively blanked light present at recording surfaces 26 and 27 representing first and second information tracks. The outputs of channels 1 and 2 are communicated via coupling means 36 and 37 to the input of decoder 38 wherein the signals are again recombined to provide the original video signal 39 which then provides an input to conventional video baseband reproduction equipment.

Referring to FIG. 2, a specific signal in the form of a square wave originally provided as channels 1 and 2 and the decoder 38 combined composite signals are shown. Referring to the graphical representation of channel 1, a signal 33' corresponding to the output from transducer 33 is shown as a square wave having a period T1 and having a transition from low to high 41 and a transition from high to low of 42. Similarly, channel 2 may be represented as a square wave signal 34' having a period T2 and a transition from low to high of 46 and a transition from high to low of 47. Decoder 38 multiplexes the signal 33' and 34' to provide signal 39. In the preferred embodiment, the transition 41 of channel 1 provides a first transition 48 of output signal 39. Next, transition 46 in channel 2 provides transition 49 in signal 39. The next transition 51 of signal 39 is provided by transition 42 of channel 1, and transition 47 of channel 2 provides transition 52 of signal 39. Thus it is clear that the interspersed transitions of channels 1 and 2 alternately provide transitions in the output signal 39. Further, it is clear that period T1, period T2, and the corresponding information transfer rate of each separate channel, C1 and C2 respectively being rate limited by the recording surface and transducer responsive thereto may be combined to provide an improved information transfer rate approximately equal to the sum of C1 and C2. Referring to signal 39, it may be seen that the information transfer rate is correspondingly increased and may be equal to the combined information transfer capacity of channel 1 and channel 2.

As disclosed in the cross-referenced applications CONTACTING STYLUS OPTICAL REPRODUCTION SYSTEM and SINGLE LENS, MULTI-BEAM SYSTEM AND METHOD FOR HIGH RESOLUTION RECORDING, it has been found that the capacity of a single channel such as channel 1 may be 2.87 Megahertz and likewise channel 2 may be 2.87 Megahertz. When combined by decoder 38, output signal 39 may provide a bandwidth of the combination of channels 1 and 2 or approximately 5.75 Megahertz.

It has been found that the limitation for a given relative velocity between the transducer and recording medium is determined by the intrinsic resolution of the scanning transducer 33 or 34 respectively. Of course, this presumes that the modulation and beam recording technique and the subsequent multiple pressing of replica discs do not combine to substantially limit the density of recorded information. Of course, the maximum number of tracks having pits 28 is constrained by the minimum groove width required for mechanical tracking by the transducers 33 and 34, either by external servo-mechanism means or by directly contacting pickup means. A groove width of 6 micrometers in a disc rotating at 225 rpm provides the above-mentioned 5.75 Megahertz bandwidth.

It is apparent that in the present invention so long as the transducers can resolve a minimum information track width across the groove 23, then "N" plural information tracks and associated transducers may be placed across the groove and "N" information channels may be received as increased information packing density within the surface area of the groove and subsequently the channels may be reproduced by a decoder 38 having N decode channels. Therefore, a degree of independence can be obtained between the width of the groove, which is limited by mechanical tracking requirements and the packing density of the pits along the groove having a minimum pit spacing such that the transducer means may resolve the pit transitions during operation.

It is further important to note that although in the present invention variable pit width, which is analogous to a form of pulse width modulation, and variable pit-to-pit spacing, analogous to pulse position modulation, is used, other modulation techniques may be likewise employed. Thus, the information may be presented directly as the position of the pit edges or transitions and thus be a form of direct phase or frequency modulation. Alternately, of course, well known information processing encoding techniques may be used for a further increase in information packing density and concomitant information transfer rates from the present system.

Thus it is apparent that there has been provided an improved high density and high transfer rate information transfer system and a method for utilizing the information storage capacity of a grooved recording medium. Specifically, a system and method has been disclosed for multiplexed recording of wideband information such as composite video and sound signal or digital information on a disc and the subsequent reproduction and demultiplexing of the stored information to provide the original signal.

I claim:

1. An information recording and reproducing system having a high information rate comprising a disc storage medium having a recording groove and associated transducer means, the combination comprising: a pair of recording tracks formed in said recording groove, means for receiving the information to be recorded, processing and encoding the information and recording portions thereof in each of said tracks as a plurality of pits disposed along said tracks with the spacing and size of said pits modulated in accordance with the input information, each of said tracks having a predetermined maximum information rate capacity which is less than the high information rate, transducer means adapted to simultaneously scan each of said tracks and each providing output signals corresponding to the information on said tracks, and means for decoding the output of said transducer means and providing information at the original high information rate.

2. A system as in claim 1 wherein said tracks have approximately equal information capacity.

* * * * *

UNITED STATES PATENT AND TRADEMARK OFFICE
CERTIFICATE OF CORRECTION

PATENT NO. : 4,006,292
DATED : Feb. 1, 1977
INVENTOR(S) : Louis F. Schaefer

It is certified that error appears in the above-identified patent and that said Letters Patent are hereby corrected as shown below:

In the title block, line [73], change "Sharp Corporation, Osaka, Japan" to "Nihon Denshi Kabushiki Kaisha, Tokyo, Japan and Sharp Kabushiki Kaisha, Osaka, Japan , part interest each.

Signed and Sealed this thirtieth Day of August 1977

[SEAL]

Attest:

RUTH C. MASON
*Attesting Officer*

C. MARSHALL DANN
*Commissioner of Patents and Trademarks*